United States Patent
Hartl et al.

(10) Patent No.: US 9,033,100 B2
(45) Date of Patent: May 19, 2015

(54) SOUND SUPPRESSOR DEVICE FOR AN AIR DRYING UNIT OF A COMPRESSED-AIR SUPPLY SYSTEM

(75) Inventors: Michael Hartl, Unterhaching (DE); Matthias Fritz, Erfurt (DE); Christian Achatz, Freising (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 0 days.

(21) Appl. No.: 14/240,591

(22) PCT Filed: Aug. 14, 2012

(86) PCT No.: PCT/EP2012/065854
§ 371 (c)(1),
(2), (4) Date: Feb. 24, 2014

(87) PCT Pub. No.: WO2013/026736
PCT Pub. Date: Feb. 28, 2013

(65) Prior Publication Data
US 2014/0231169 A1  Aug. 21, 2014

(30) Foreign Application Priority Data
Aug. 25, 2011 (DE) .......................... 10 2011 111 625

(51) Int. Cl.
| B60T 17/02 | (2006.01) |
| B60T 17/00 | (2006.01) |
| B01D 53/26 | (2006.01) |

(52) U.S. Cl.
CPC ............. *B60T 17/008* (2013.01); *B60T 17/006* (2013.01); *B01D 53/265* (2013.01)

(58) Field of Classification Search
CPC ............................ B60T 17/008; B01D 53/265
USPC ........................................................ 181/230
See application file for complete search history.

(56) References Cited

U.S. PATENT DOCUMENTS

| 2012/0137887 A1* | 6/2012 | Minato et al. .................. 96/118 |
| 2012/0192710 A1* | 8/2012 | Moore et al. .................. 92/12.2 |

(Continued)

FOREIGN PATENT DOCUMENTS

| DE | 3445699 A1 | 6/1986 |
| DE | 3533893 A1 | 3/1987 |

(Continued)

OTHER PUBLICATIONS

Search Report for International Patent Application No. PCT/EP2012/065854; Nov. 2, 2012.

(Continued)

*Primary Examiner* — Jeremy Luks
(74) *Attorney, Agent, or Firm* — Barnes & Thornburg LLP

(57) ABSTRACT

A sound suppressor device for an air drying unit of a compressed-air supply system having a sound suppressor housing on which is arranged an inlet opening for the supply of condensate-laden compressed air to be discharged from the air drying unit and at least one outlet opening for the discharge of the condensate-laden compressed air to the outside, wherein the inlet opening issues into at least one pre-chamber of the sound suppressor housing, which pre-chamber issues into post-chambers which are connected in parallel and which are arranged around a heating rod arranged centrally in the sound suppressor housing.

12 Claims, 3 Drawing Sheets

(56) References Cited

U.S. PATENT DOCUMENTS

2013/0320639 A1* 12/2013 Frank et al. ............... 280/5.514
2014/0144326 A1* 5/2014 Minato et al. ............... 96/108

FOREIGN PATENT DOCUMENTS

| DE | 4134115 A1 | 4/1993 | | |
| DE | 19701361 C1 | 5/1998 | | |
| DE | 10243034 A1 | 3/2004 | | |
| DE | 202004019045 U1 | 3/2005 | | |
| DE | 69827876 T2 | 4/2006 | | |
| EP | 119047 A1 | * | 9/1984 | .............. F01N 1/08 |
| EP | 0379160 A1 | 7/1990 | | |
| FR | 2455168 A1 | 11/1980 | | |
| FR | 2544794 A1 | 10/1984 | | |
| JP | 2010201323 A | * | 9/2010 | |

OTHER PUBLICATIONS

International Preliminary Report on Patentability and Written Opinion of the International Search Authority for International Patent Application No. PCT/EP2012/065854, dated Aug. 14, 2012.

English Translation of International Preliminary Report on Patentability and Written Opinion of the International Search Authority for International Patent Application No. PCT/EP2012/065854, dated Aug. 14, 2012.

* cited by examiner

SOUND SUPPRESSOR DEVICE FOR AN AIR DRYING UNIT OF A COMPRESSED-AIR SUPPLY SYSTEM

PRIORITY CLAIM

This patent application is a U.S. National Phase of International Patent Application No. PCT/EP2012/065854, filed 14 Aug. 2012, which claims priority to German Patent Application No. 10 2011 111 625.0, filed 25 Aug. 2011, the disclosures of which are incorporated herein by reference in their entirety.

FIELD

Disclosed embodiments relate to a sound suppressor device for an air drying unit of a compressed-air supply system, having a sound suppressor housing, on which is arranged an inlet opening for the supply of condensate-laden compressed air to be discharged from the air drying unit and an outlet opening for the discharge of the compressed air to the outside.

BACKGROUND

The area of application extends principally to rail vehicles, the compressed-air supply system of which serves primarily to provide a brake pressure for the vehicle brakes. To produce braking air which is as dry as possible, the compressor-operated compressed-air supply system comprises an air drying unit for air preparation, the unit removing the moisture contained in the compressed air which has been drawn in from outside and compressed. For this purpose, single- and two-chamber air driers are the principal types used in the construction of rail vehicles, the driers removing the moisture from the compressed air and discharging it to the outside in condensate-laden compressed air.

DE 34 45 699 A1 has disclosed a single-chamber air drier which is provided for compressed-air supply systems that can be charged in intermittent mode and in which has a single regeneratable drying cartridge and a moisture sensor which measures the prevailing air humidity in the air reservoir volume. During the idling phase of the compressor with air humidity in the air reservoir which exceeds a defined threshold, an electronic evaluation unit initiates regeneration of the drying cartridge. During the regeneration mode, the compressed air is passed backward through the drying cartridge in such a way that the condensate-laden compressed air emerging from the cartridge reaches a discharge valve for discharge to the outside. The discharge valve is provided with an unenclosed exhaust port, with the result that the condensate-laden compressed air is released to the outside with a loud outflow noise. Owing to the switch to the regeneration mode, this outflow noise is preceded by a surge of compressed air, which can reach extreme noise levels. Especially in the case of rail vehicles parked in stations close to residential areas, this leads to noise pollution, especially when the rail vehicles are supposed to be held in readiness overnight.

DE 35 33 893 A1 discloses a two-chamber air drier in a compressed-air supply system for rail vehicles, which has two drying canisters which can be operated in alternation to ensure a continuous compressed air supply. While the compressed air flow produced by the compressor is being dried in one of the drying canisters, the desiccant in the other drying canister is regenerated. By means of a switching valve connected to the two drying canisters, compressed air to be dried is introduced into one of the drying canisters in an alternating sequence that can be predetermined in terms of time, and air used in each case during regeneration in the other drying canister is discharged from the latter. The switching valve furthermore has an outlet opening for discharging condensate-laden compressed air formed during the regeneration of the drying canister in the regeneration mode. Uncontained exhaust air passes to the outside from this outlet opening too.

An attempt has already been made to provide the outlet openings of known air drying units for rail vehicles with a sound suppressor, the latter generally being embodied as a sintered metal or plastic part or as a container filled with suppression material. However, solutions of this kind are of considerable size and achieve only limited sound suppression.

Known prior art sound suppressors furthermore have the disadvantage that the condensate contained in the compressed air freezes in the sound suppressor and can thereby obstruct the exit of the compressed air to the outside.

SUMMARY

Disclosed embodiments provide a sound suppressor device for an air drying unit in a compressed-air supply system, in particular for rail vehicles, which, by simple technical means of small overall size, achieves high sound suppression upon initiation of a regeneration mode for a drying canister and the expulsion of condensate-laden compressed air, wherein the condensate from the compressed air is also discharged reliably to the outside.

BRIEF DESCRIPTION OF THE FIGURES

Further measures that improve the invention are explained in greater detail below by means of the figures, together with the description of disclosed embodiments. Of the figures.

DETAILED DESCRIPTION OF THE DISCLOSED EMBODIMENTS

Figure 1:
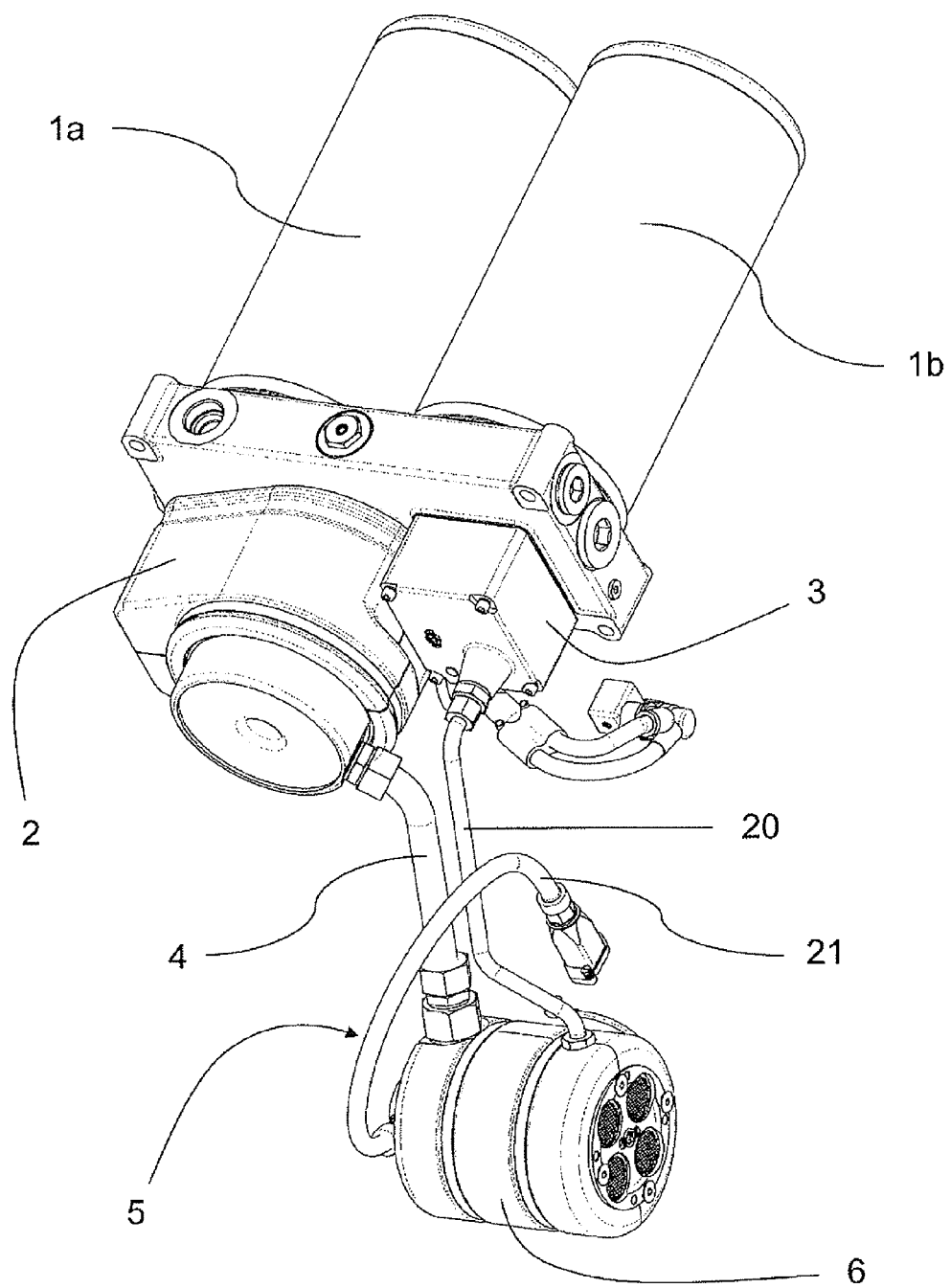
FIG. 1 shows a perspective view of an air drying unit for a compressed-air supply system with a sound suppressor device arranged thereon.

Disclosed embodiments include the technical teaching that an inlet opening of the sound suppressor housing issues into at least one internal pre-chamber, which issues into a plurality of post-chambers, which are connected in parallel and are arranged around a heating rod arranged centrally in the sound suppressor housing. To ensure highly efficient heating, the heating rod and the post-chambers may be in contact with the same housing part.

The advantage of the solution according to the disclosed embodiments consists, in particular, in the fact that the post-chambers at risk of freezing are actively heated, thereby making it possible to avoid freezing of condensate which collects therein and is to be discharged to the outside. Since the sound suppressor is based on a special chamber technology, unhindered flow of condensate through the pre- and post-chambers, which serve primarily for sound suppression, is made possible. By virtue of the chamber arrangement, the sound suppressor housing can be of very small construction, and therefore there is little space requirement for the air drying unit at the installation site thereof.

According to at least one disclosed embodiment, the post-chambers are each of cylindrical design and are arranged equidistantly from one another and along a circle around the heating rod, arranged coaxially thereto in the sound suppressor housing, thereby forming intermediate housing webs. The intermediate housing webs restrict the heat transfer to the outside and ensure that only a small amount of heat energy from the heating rod is dissipated unused to the outside, that is to say that the heat energy from the heating rod remains concentrated within the sound suppressor housing. This has the effect that there could be icing in the outer region of a post-chamber under unfavorable conditions but that the inner regions of the post-chambers remain free from ice owing to the increased component temperature. Tests have shown that this optimum usage of the heat energy occurs when the intermediate housing webs occupy less than 40% of the circle, which is situated in the thinnest region of the intermediate housing webs.

According to another disclosed embodiment, the number of pre-chambers and the number of post-chambers is in a ratio of at least 1:2. There should, therefore, be at least twice as many post-chambers as pre-chambers to achieve an effective sound suppression effect.

A measure that serves to achieve the same advantage is that the at least one pre-chamber is embodied as a free resonance volume according to the mathematical formula $V=0.8\times PF+/-60\%$, depending on the delivery rate PF. Here, the resonance volume V is measured in cm3 and the delivery rate is measured in 1/min. By virtue of the free resonance volume created in this way in the pre-chamber, which may be of larger design than the post-chambers, high sound suppression can be achieved just by the pre-chamber.

In another disclosed embodiment, the volume of the pre-chamber can also be filled or partially filled with a suppression material or a sintered material. Optionally, the post-chambers should be filled only partially with a sound suppression material, thus giving rise to an antechamber within the post-chambers. This antechamber is particularly advantageous if the ratio of the volume filled with sound suppression material to the volume of the antechamber is from 2.7:1 to 1.3:1. In at least one disclosed embodiment, the sound suppressor device has a total of four post-chambers. The sound suppression material in the filled volume of the pre-chamber may be a mesh of plastic, optionally polyethylene. As an alternative, other materials, such as PTFE or sintered bronze, are also conceivable.

According to another disclosed embodiment, the pre-chamber can also be equipped with a plurality of mutually spaced dividing plates, each with at least one aperture. The apertures may be situated opposite one another, forcing a pressure surge to travel through a long wavelength. The spacing between the individual dividing plates can be uniform. However, a different, an increasing or a decreasing plate spacing is also conceivable, thereby making it possible selectively to suppress different frequency components of a pressure surge.

In yet another disclosed embodiment, the suppression material in the post-chambers is a plastic mesh consisting of a rolled strip, the length of which is configured in such a way that the roll just fits into the available circumference of the cylindrical post-chambers. It is thereby possible to achieve effective filling of the cylindrical post-chambers with sound suppression material in a simple manner.

The post-chambers of the sound suppressor device should be integrated or installed in the lower part of a condensate remover of the sound suppressor device and should be arranged close to the heating rod. In addition, a mirror-image arrangement is also conceivable.

It is furthermore proposed that the post-chambers are connected by respectively associated restrictors to the associated pre-chamber, which may be arranged thereabove. To achieve the greatest possible sound suppression, the diameter of the restrictors should be in a ratio of 1:2 to 1:5 to the diameter of the post-chambers.

It is furthermore proposed that the sum of the volumes of the post-chambers is in a volume ratio of 1:6 to 1:10 to the volume of a single pre-chamber to achieve high sound suppression.

According to another disclosed embodiment, the heating rod is embodied with an integrated thermostat element, which controls the switching on and off of the heating rod in accordance with the component temperature. By virtue of the thermostat element this control can therefore be accomplished automatically without external intervention. The heating rod should extend along the entire, optionally cylindrical, sound suppressor housing to develop a large heating effect. The sound suppressor housing with the pre- and post-chambers integrated therein may be composed of an aluminum alloy to bring about the greatest possible thermal conductivity. According to yet another disclosed embodiment which improves the thermal properties of the sound suppressor device, the sound suppressor housing is enclosed in a thermal insulation tape. This offers the advantage that the heat output of the heating rod remains concentrated in the sound suppressor housing and that the proportion which is radiated to the outside via the surface of the sound suppressor housing is not too great. This ensures that positive component temperatures are maintained, even in the presence of critical negative temperatures at the points at which condensate is discharged from the sound suppressor housing.

It is furthermore proposed that the compressed air flow is deflected at a right angle between the air inlet into the sound suppressor housing and the air outlet, this being achievable through the arrangement of the external ports and the routing of the compressed air through the pre- and post-chambers. This measure improves the efficiency of sound suppression.

According to another disclosed embodiment, a vent from a solenoid valve integrated into the controller is routed via a separate pipe into the sound suppressor housing. This is because the controller has a solenoid valve for switching the operating phases of the air drying unit, the air consumed by which is exhausted from the housing of the controller. The exhausting of the control air leads to additional whistling, and this can likewise be eliminated by means of the sound suppressor device.

According to FIG. 1, a two-chamber air drying unit comprises two drying canisters 1a and 1b, which operate alternately in two phases, namely a drying phase and a regeneration phase, to ensure drying of a continuous moist compressed air flow passed through.

While the main air flow is being dried in one drying canister 1a, the desiccant in the other drying canister 1b is regenerated by reverse operation. These phases are implemented by means of a switching valve 2 as stipulated by an electronic controller 3. A sound suppressor device is connected to the outlet side of the switching valve 2 by a pipe 4. For this purpose, the pipe 4 is coupled to an inlet opening 5 on the sound suppressor housing. The inlet opening 5 is used to supply condensate-laden compressed air to be discharged from the air drying unit. The sound suppressor device is used to acoustically suppress the outflow noise and, at the same time, to reliably discharge the condensate contained in the compressed air to the outside, more specifically via four outlet openings 7, which are arranged on the bottom of the sound suppressor housing 6. An electric cable 8 leading to the noise suppressor housing 6 furthermore emerges from the electronic controller 3, via which cable electric energy for operating a heating rod in the sound suppressor housing 6—not shown specifically here—supplies.

The outlet openings 7 are arranged offset at right angles to the inflow direction determined by the inlet opening, to deflect the compressed air flowing through the sound suppressor housing 6.

A vent from a solenoid valve integrated into the controller 3 is furthermore routed via a separate pipe 20 into the sound suppressor housing 6 to suppress the outflow noise of the solenoid valve. Moreover, a heating rod—likewise not visible here—is supplied with electric energy for heating the sound suppressor housing 6 via an electric line 21.

Figure 2:
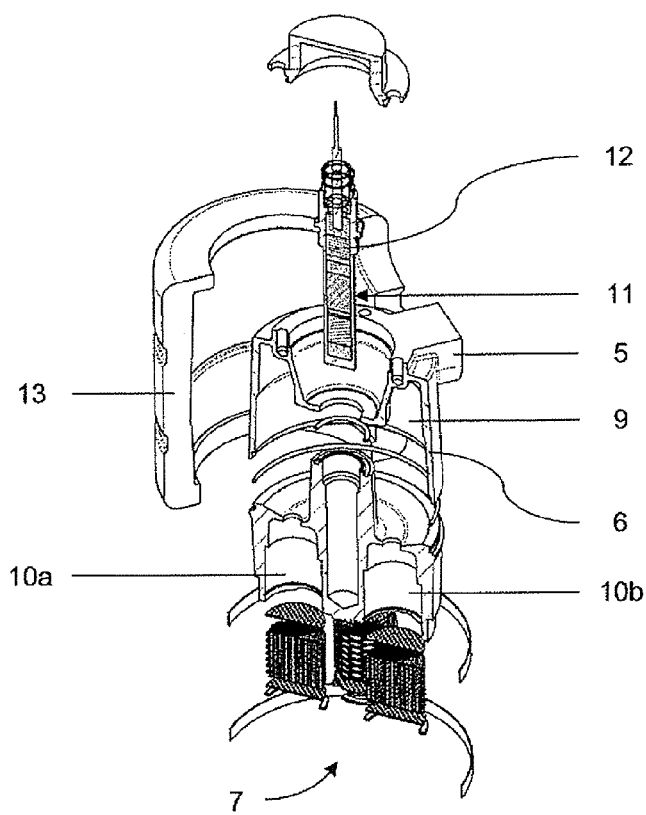
FIG. 2 shows a perspective exploded view of a sound suppressor device in a first disclosed embodiment.

According to FIG. 2, the condensate-laden compressed air supplied via the inlet opening 5 enters a pre-chamber 9 integrated into the sound suppressor housing 6, which chamber issues at the bottom into four post-chambers 10a, 10b connected in parallel with one another—of which only two post-chambers are visible here. At the bottom, the four post-chambers 10a to 10d each form an opening to the outside, which represents the outlet opening 7 of the sound suppressor housing 6. The four post-chambers 10a-10b are positioned around a heating rod 7 arranged centrally in the sound suppressor housing 6. The heating rod 7 is used to supply heat energy to prevent the condensate from freezing in the sound suppressor housing 6. The heating rod 11 is provided with an integrated thermostat element 12, which automatically controls the switching on and off of the heating rod 11 in accordance with the component temperature.

To ensure that the heat energy produced by the heating rod 11 does not escape to the outside unused, the sound suppressor housing 6 is surrounded by a two-shell thermal insulating jacket 13 composed of an insulating material.

Figure 3:
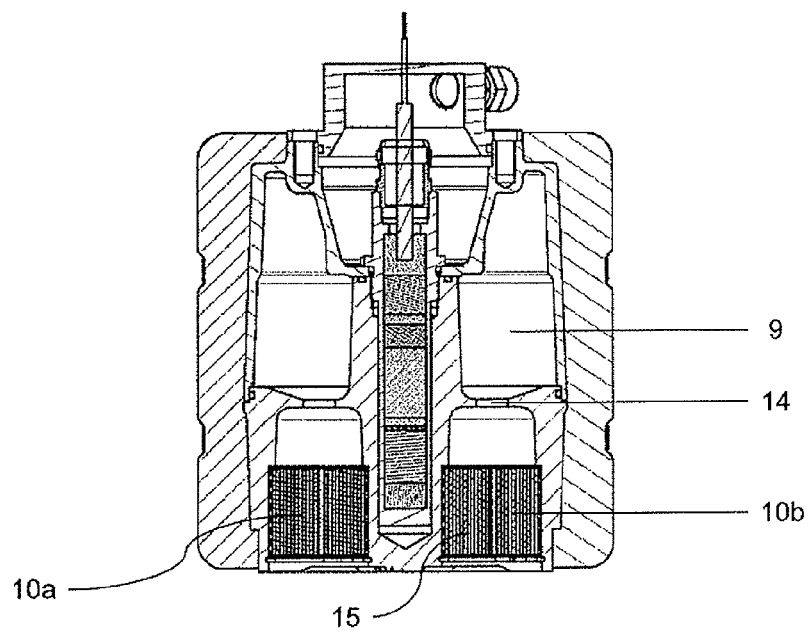
FIG. 3 shows a longitudinal section through the sound suppressor device according to FIG. 2 in the assembled state.

According to FIG. 3, the visible post-chambers 10a and 10b are coupled (by way of example) to the associated large-volume pre-chamber 9 via the associated restrictors 14. The restrictors 9 ensure a large sound suppression effect by the sound suppressor device. In this embodiment, the post-chambers 10a, 10b are partially filled with a sound suppression material 15, which is a plastic net wound in a spiral.

Figure 4:
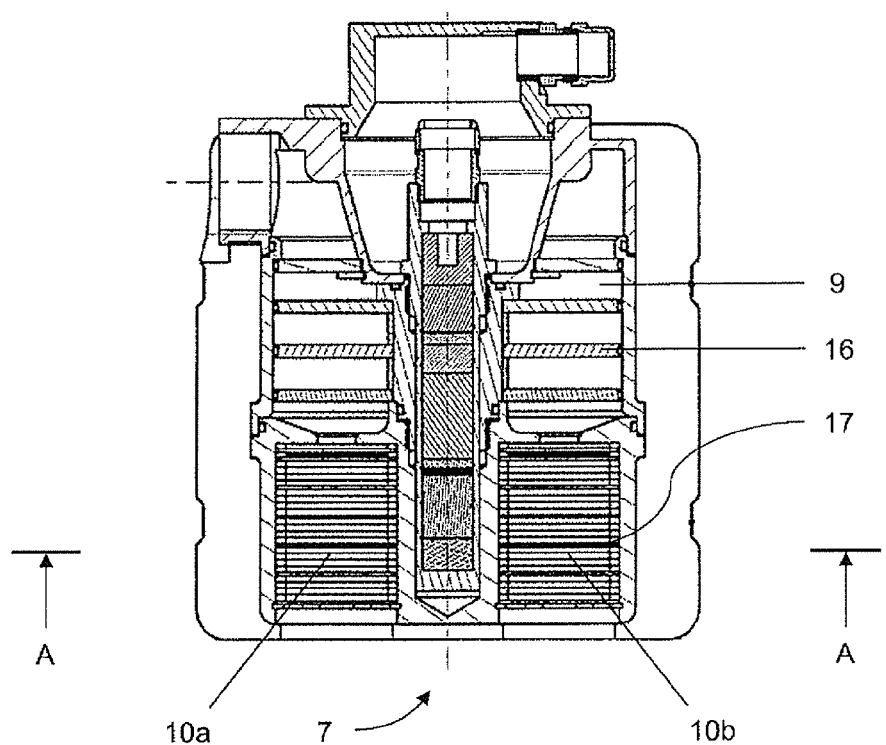
FIG. 4 shows a longitudinal section through another disclosed embodiment of a sound suppressor device with a modified pre-chamber.

According to another disclosed embodiment of the solution, which is illustrated in FIG. 4, a plurality of mutually spaced dividing plates 16, each with at least one aperture, is arranged in the pre-chamber 9 to achieve a further sound suppression effect. Here, the dividing plates 16 are arranged at an equal spacing. In this embodiment, the post-chambers 10a and 10b are also filled with a plurality of transversely extending screen plates 17 for noise suppression.

Figure 5:
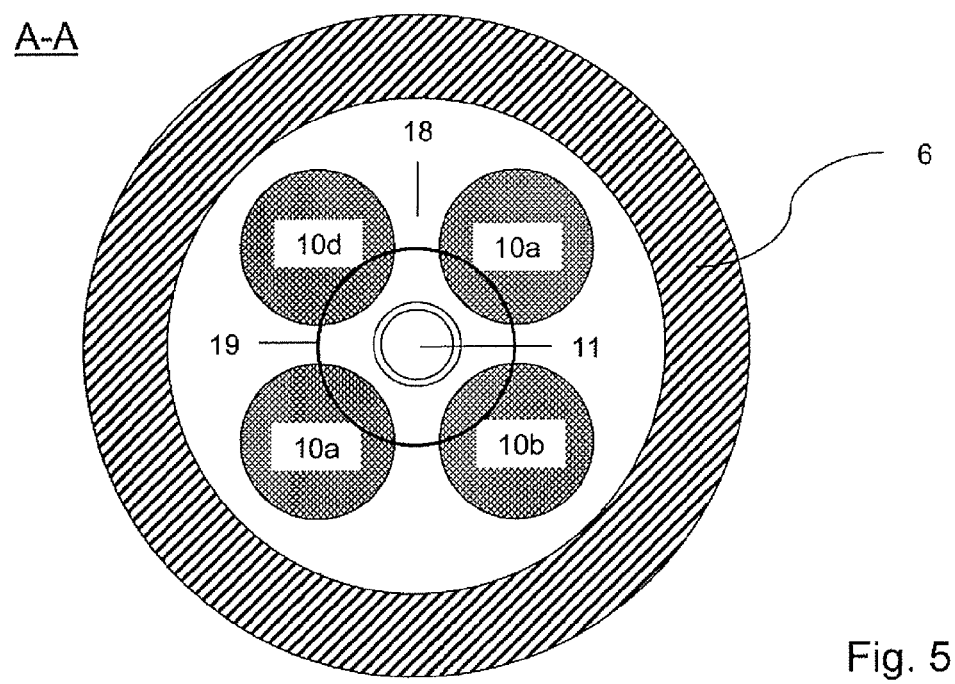
FIG. 5 shows a cross section along the section line A-A of the sound suppressor device according to FIG. 4.

As is apparent from the cross section, illustrated in FIG. 5, through the sound suppressor housing 6 at the level of the post-chambers 10a to 10d, these are each of cylindrical design and are arranged equidistantly from one another, thereby forming intermediate housing webs 18. The post-chambers 10a to 10d are furthermore arranged coaxially in the sound suppressor housing 6 along a circle 19 and around the heating rod 11 arranged centrally therein. In terms of length, the intermediate housing webs 18 occupy less than 40% of the circumference of the circle 19, which is situated in the thinnest region of the intermediate housing webs 18. Unwanted heat dissipation to the outside is thereby minimized, combined, at the same time, with adequate component stability.

The invention is not limited to the illustrative embodiments described above. On the contrary, modifications which are encompassed by the scope of protection of the subsequent claims are also conceivable. Thus, it is also possible, for example, for the sound suppressor device described here to be used in single-chamber air driers.

LIST OF REFERENCE SIGNS 1 drying canister
2 switching valve
3 controller
4 pipe
5 inlet opening
6 sound suppressor housing
7 outlet opening
8 electric cable
9 pre-chamber
10 post-chamber
11 heating rod
12 thermostat element
13 insulating jacket
14 restrictor
15 sound suppression material
16 dividing plates
17 screen plates
18 intermediate housing webs
19 circle
20 pipe
21 electric line

The invention claimed is:

1. A sound suppressor device for an air drying unit of a compressed-air supply system, comprising:
    a sound suppressor housing, on which is arranged an inlet opening for the supply of condensate-laden compressed air to be discharged from the air drying unit; and
    at least one outlet opening for the discharge of the condensate-laden compressed air to the outside,
    wherein the inlet opening issues into at least one pre-chamber of the sound suppressor housing, which pre-chamber issues into a plurality of post-chambers, which are connected in parallel and are arranged around a heating rod arranged centrally in the sound suppressor housing.

2. The sound suppressor device of claim 1,
    wherein the post-chambers are each of cylindrical design and are arranged equidistantly from one another and along a circle around the heating rod, arranged coaxially thereto in the sound suppressor housing, thereby forming intermediate housing webs.

3. The sound suppressor device of claim 1,
    wherein the number of pre-chambers and the number of post-chambers is in a ratio of at least 1:2.

4. The sound suppressor device of claim 2,
    wherein the intermediate housing webs occupy less than 40% of the circle, which is situated in the thinnest region of the intermediate housing webs.

5. The sound suppressor device of claim 1,
    wherein the at least one pre-chamber is embodied as a free resonance volume (V) according to the formula $V = 0.8 \times P_F +/- 60\%$, depending on the delivery rate ($P_F$).

6. The sound suppressor device of claim 1, wherein the at least one pre-chamber is at least partially filled with a sound suppression material or a sintered material.

7. The sound suppressor device of claim 1, further comprising a plurality of mutually spaced dividing plates, each with at least one aperture, arranged in the at least one pre-chamber.

8. The sound suppressor device of claim 1, wherein the sum of the volumes of the post-chambers is in a volume ratio of 1:6 to 1:10 to the volume of a single pre-chamber.

9. The sound suppressor device of claim 1, wherein the post-chambers are connected by respectively associated restrictors to the associated pre-chamber.

10. The sound suppressor device of claim 1, further comprising a vent from a solenoid valve integrated into the controller and routed via a pipe into the at least one pre-chamber or one of the post-chambers in the sound suppressor housing.

11. The sound suppressor device of claim 1, wherein the sound suppressor housing is enclosed in a thermal insulating jacket.

12. The sound suppressor device of claim 1, wherein the outlet opening is arranged offset at right angles to the inflow direction of the compressed air into the sound suppressor housing, said direction being determined by the inlet opening, in order to deflect the compressed air flowing through the sound suppressor housing.

* * * * *